United States Patent [19]

Williams et al.

[11] Patent Number: 4,932,451
[45] Date of Patent: Jun. 12, 1990

[54] VEHICLE WHEEL END ASSEMBLY WITH AIR PASSAGE

[75] Inventors: Donald L. Williams, Port Clinton; William M. Sandy, Jr., Seven Hills, both of Ohio

[73] Assignee: General Motors Corporation, Detroit, Mich.

[21] Appl. No.: 301,766

[22] Filed: Jan. 26, 1989

[51] Int. Cl.⁵ .................. B60C 23/00; B60C 27/00
[52] U.S. Cl. .................... 152/417; 152/415; 301/125; 301/131
[58] Field of Search .............. 152/416, 417, 415; 301/5 VH, 125, 124 H, 131, 126, 105 R

[56] References Cited

U.S. PATENT DOCUMENTS

| | | | |
|---|---|---|---|
| 2,976,906 | 3/1961 | Kamm et al. | 152/417 |
| 4,431,043 | 2/1984 | Goodell et al. | 152/417 |
| 4,434,833 | 3/1984 | Swanson et al. | 152/417 |
| 4,470,506 | 9/1984 | Goodell et al. | 206/223 |
| 4,498,709 | 2/1985 | Wells et al. | 301/5 |
| 4,582,107 | 4/1986 | Scully | 152/417 |
| 4,591,212 | 3/1986 | Balken et al. | 301/105 R |
| 4,705,090 | 11/1987 | Bartos | 152/417 |
| 4,733,707 | 3/1988 | Goodell et al. | 152/417 |
| 4,798,560 | 1/1989 | Farrell | 464/178 |

*Primary Examiner*—Robert A. Dawson
*Assistant Examiner*—Gregory J. Wilber
*Attorney, Agent, or Firm*—Patrick M. Griffin

[57] ABSTRACT

A wheel end assembly used with a tire pressure management system has a pressurized air passage formed in part by the annular clearance space formed between a drive shaft and a central bore in the tire mounting spindle of the end assembly.

3 Claims, 1 Drawing Sheet

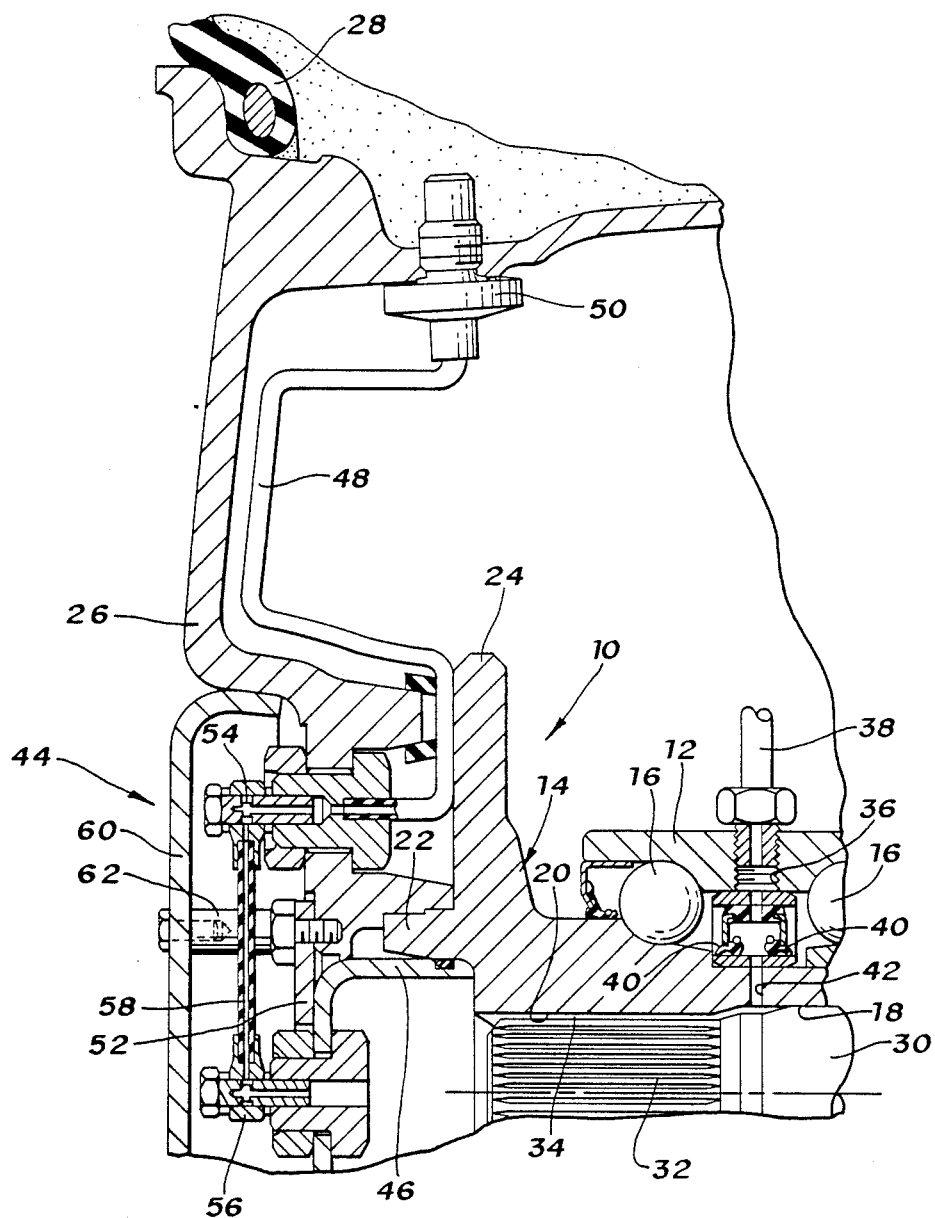

VEHICLE WHEEL END ASSEMBLY WITH AIR PASSAGE

This invention relates to vehicle wheel end systems in general, and specifically to such an assembly to be used with a vehicle tire pressure management system.

BACKGROUND OF THE INVENTION

Vehicle tire pressure management systems must provide an air path from a pressurized air source to the tire. Since the tire is rotating and the air source is not, there must be a rolling seal chamber at some point in the path. This seal chamber is typically located between the stationary hub of the wheel end assembly and the rotating, tire mounting spindle. The tire is generally offset axially from the hub. Air must be taken axially from the rolling seal chamber to the tire. This is typically done by providing a conduit that extends axially from the seal chamber through the end assembly to the tire, or the conduit may be eliminated by rifle drilling long passages axially through one member of the end assembly. An added conduit in an inaccessible area clearly involves extra expense. Drilling a passage axially through an end member that does not have a large radial thickness is also difficult.

SUMMARY OF THE INVENTION

The invention improves upon the above in a driven wheel end assembly by taking advantage of an clearance space between the spindle and a drive shaft that extends through the spindle to provide at least part of the total air path.

In the preferred embodiment disclosed, the end assembly includes a stationary hub fixed to the vehicle that surrounds a rotatable, coaxial spindle to which the tire is mounted, axially offset to the side of the hub. Two rows of bearing balls support the spindle within the hub. The spindle has a central axial bore, which has a smooth portion at one end and and a splined portion at the other end, nearest the tire. The drive shaft also has a smooth portion and a splined end. The drive shaft is inserted through the spindle bore such that the respective smooth portions fit together very closely, while the splined portions interfit non turnably, but with a slight annular clearance space that is open at the end nearest the tire. An inlet passage opens radially through the hub between the ball rows, so that pressurized air from whatever source may be supplied thereto. A pair of seals mounted to the inside of the hub, bordering the inlet passage and rubbing on the outside of the spindle, provide a rolling seal chamber to receive pressurized air from the inlet. A feed passage cut through the spindle connects the rolling seal chamber and the annular clearance space described, and pressurized air flowing into the annular clearance space can exit only through the open end. A suitable outlet means, such as an easily accessible cover and conduit, takes the pressurized air from the open end of the annular clearance space to the tire.

It is, therefore, a general object of the invention to provide a wheel end assembly with a pressurized air path involving fewer components and easier assembly.

It is another object of the invention to provide such an air path by using an annular clearance space between the bore of a tire mounting spindle of the end assembly and a drive shaft that extends through the bore to provide part of the air path.

It is another object of the advantage to provide a wheel end assembly in which a drive shaft having a splined end and a smooth portion interfits with a respective smooth portion and splined portion of the spindle bore so as to provide an annular clearance space that is open only at one end, at which one end an easily accessible outlet means can be mounted to take pressurized air to the tire.

DESCRIPTION OF THE PREFERRED EMBODIMENT

These and other objects and features of the invention will appear from the following written description, and from the figure, which shows a portion of a hub, spindle, tire rim and tire in cross section, with the relevant portion of the drive shaft shown in elevation.

The wheel end assembly of the invention, designated generally at 10, has an outer hub 12 and an inner spindle 14 supported coaxially within the hub 12 by a pair of ball end rows 16 which form a part of the wheel bearing assembly. Hub 12 is fixed to the vehicle frame, not shown, while spindle 14 is rotatable. Spindle 14 has a central bore comprised of a cylindrical, smooth portion 18 and a cylindrical splined portion 20. Splined portion 20 runs all the way to the left end of the spindle bore, opening coaxially through a central tire rim boss 22, which is surrounded by a tire mounting flange 24. A centrally apertured tire rim 26 is mounted over boss 22 to flange 24 by standard lug nuts, not shown. A tire 28 on rim 26 is therefore located axially outboard of the stationary hub 12. When a tire pressure management system, not shown, is to be used with tire 28, the problem faced is to get pressurized air from the stationary hub 12 axially out to the offset tire 28. In the invention, this is done very advantageously with a minimum of extra components or manufacturing steps.

End assembly 10 is the driven or powered kind, in which a drive shaft comprised of a cylindrical, smooth portion 30 with at least one splined end 32 is inserted through spindle 14 with the respective spindle bore smooth portion 18 and drive shaft smooth portion 30 closely engaged, and with the respective spindle bore splined portion 20 and drive shaft splined end 32 interfitted to give a non turning, driving connection. At the same time an annular clearance space, indicated at 34 is created, since the respective splined portions 20 and 32 do not interfit absolutely tightly. At the same time, the respective smooth portions 18 and 30 do fit closely enough together that the other end of annular clearance space 34 is effectively blocked, and only the one end nearest to the tire 28 is open.

The pressurized air path from hub 12 to tire 28 begins with an inlet passage 36 drilled radially inwardly through the wall of hub 12, about midway between the ball rows 16. This represents the minimal cut necessary to get access to the interior of the bearing assembly 10, and does not weaken the hub 12 significantly. A pressure supply line 38 is attached to inlet passage 36, which would run back to a pressurized air source, not shown. Since hub 12 is stationary and spindle 14 is not, a rolling seal chamber is necessary to take pressurized air to spindle 14. This is created by a pair of rubbing seals 40 mounted to the inside of hub 12 bordering inlet passage 36 and rubbing on the outside of spindle 14. A feed passage 42 is drilled radially through spindle 14 from a location bordered by the rubbing seals 40 into the annular clearance space 34. Feed passage 42, like inlet passage 36, represents the minimal cut through spindle 14 necessary to communicate with the annular space 34, and is easily manufactured, without weakening spindle 14 significantly. This may be contrasted to the long, rifle drilled axial passages or separate conduits described above. Pressurized air fed into the annular clearance space 34 can exit only at the left end, centrally through boss 22. No other feed passages need be cut to get air through spindle 14.

The final leg of the total air path is an outlet means mounted to spindle 14, designated generally at 44, which communicates the open end of annular clearance space 34 with tire 28. Basically, outlet means 44 includes a stamped metal cap 46 that is press fit to the interior of boss 22 and an outlet line 48 that runs to a suitable valve assembly 50 opening through tire rim 26. Cap 46 is easily added to or removed from boss 22, since it also fits through the center aperture of rim 26, and is secured in place by a bolt on retainer plate 52. Additional ease of access and serviceability is provided by connecting outlet line 48 to the interior of cap 46 indirectly through a pair of quick release, bayonet type fasteners 54 and 56 with a bridge line 58 between them. Fastener 54 is mounted through rim 26, while faster 56 is mounted through cap 46. Finally, a protective stone plate 60 is removably bolted over the center hole of rim 26 to several spacer lugs, one of which is shown at 62, welded to retainer plate 52. Thus, to disassemble or gain access, stone plate 60 may be unbolted, at which point fastener 54 alone may be unhooked in order to remove rim 26 without cap 46. Or, fastener 56 alone may be unhooked in order to remove retainer plate 52 and cap 46 without removing rim 26.

Thus it can be seen that there is a high degree of cooperation between the various components that minimizes the number and cost of components, as well as easing accessibility and assembly. The interfit of the respective splined spindle and shaft portions 20 and 32 provides both a driving connection, and an essentially free axial passage that terminates close to tire 28. The interfit of the spindle and shaft smooth portions 18 and 30 provide an essentially free, static blocking seal at one end of that axial passage. The spindle boss 22 serves to mount tire rim 26 as well as providing a convenient mount for the easily added and removed cap 46. The quick release fasteners 54 and 56 provide an easily removed plumbing connection between the cap 46 and the outlet line 48, which is well protected and fits within a compact space envelope at the center of rim 26, occupying only otherwise unused volume.

Variations of the preferred embodiment may be made. The invention could be incorporated in an end assembly where the stationary hub was the inner member, and the tire mounting spindle the outer member. In such a case, the driving connection would not be made by inserting the drive shaft through a central bore in the spindle, but there would still be some kind of clearance formed at whatever non turning interface existed between the drive shaft and spindle that could be used as part of the total air path. Such a clearance space need not be absolutely annular, so long as it had some axial extent, it would be useful. The hub, however, being the inner member, would likely need a longer inlet passage cut though it. In a case where the spindle was the inner member and did have a central bore, but in which the splines did not run all the way to the end of the bore nearest the tire 28, the annular clearance space would not terminate as close to the tire 28 as it does in the preferred embodiment. The clearance space could still provide part of the total air path, but the feed passage in the spindle would likely have to be longer to get air completely through the spindle. If the spindle and shaft smooth portions 18 and 30 did not exist or did not match closely enough to create an air blocking seal, a separate seal means could be provided to plug one end of the annular clearance space 34. And, in a case such as the preferred embodiment, if the annular clearance space 34 did not provide enough volume, one or a few splines could be easily removed to enlarge it, without jeopardizing the driving connection. Therefore, it will be understood that it is not intended to limit the invention to just the preferred embodiment disclosed.

We claim:

1. In a vehicle wheel end assembly having a stationary hub, a coaxial rotatable spindle to which an air filled tire is mounted, and a wheel bearing assembly, and in which said spindle is coaxially interfitted with a drive shaft at a non turning interface that defines a clearance space directly between said spindle and drive shaft, an improved means of providing pressurized air communication between said hub and tire, comprising, an inlet passage opening through said hub through which pressurized air is receivable, rubbing seal mounted to one of said hub and spindle and bordering said inlet passage so as to create a rolling seal chamber between said hub and spindle, a feed passage opening through said spindle from said rolling seal chamber into said clearance space, outlet means associated with said spindle to communicate one end of said clearance space to said tire, and, static seal means blocking the other end of said clearance space, whereby, pressurized air may flow axially through said clearance space from said inlet passage to said tire.

2. In a vehicle wheel end assembly having a stationary outer hub and an inner, coaxial rotatable spindle to which an air filled tire is mounted at a location axially offset from said hub, and a wheel bearing assembly, and in which said spindle has a central bore that receives a drive shaft therethrough at a non turning interface that defines an annular clearance space directly between said spindle and drive shaft, an improved means of providing pressurized air communication between said hub and tire, comprising, an inlet passage opening radially inwardly through said hub through which pressurized air is receivable, rubbing seals mounted to one of said hub and spindle and bordering said inlet passage so as to creat a rolling seal chamber between said hub and spindle, a feed passage opening radially inwardly through said spindle from said rolling seal chamber into said clearance space, outlet means mounted to said spindle to communicate one end of said clearance space to said tire, and static seal means blocking the other end of said clearance space, whereby, pressurized air may flow axially through said clearance space from said inlet to said tire.

3. A vehicle wheel end assembly including a means of providing pressurized air communication through said end assembly, comprising, a stationary outer hub, an inner, coaxial rotatable spindle to which an air filled tire is mounted at a location axially offset from said hub, said spindle further having a central bore therethrough including a splined portion at one end and a smooth portion at the other end, a drive shaft having a splined portion at one end and a smooth portion that is received through said spindle central bore such that the respective bore and shaft smooth portion fit closely and the respective bore and shaft splined portions interfit to create an annular clearance space that is open at only said one end, a wheel bearing assembly, an inlet passage opening radially inwardly through said hub through which pressurized air is receivable, rubbing seals mounted to one of said hub and spindle and bordering said inlet passage so as to create a rolling seal chamber between said hub and spindle, a feed passage opening radially inwardly through said spindle from said rolling seal chamber into said clearance space, and, outlet means mounted to said spindle to communicate said one end of said clearance space to said tire, whereby, pressurized air may flow axially through said clearance space from said inlet to said tire, thereby allowing for a minimal length feed passage through said spindle.

* * * * *